Jan. 30, 1968  T. R. QUERMANN  3,365,961
SINGLE-DEGREE-OF-FREEDOM GYROSCOPE
Filed Oct. 15, 1963  4 Sheets-Sheet 1

INVENTOR.
THOMAS R. QUERMANN
BY Shenier & O'Connor
ATTORNEYS

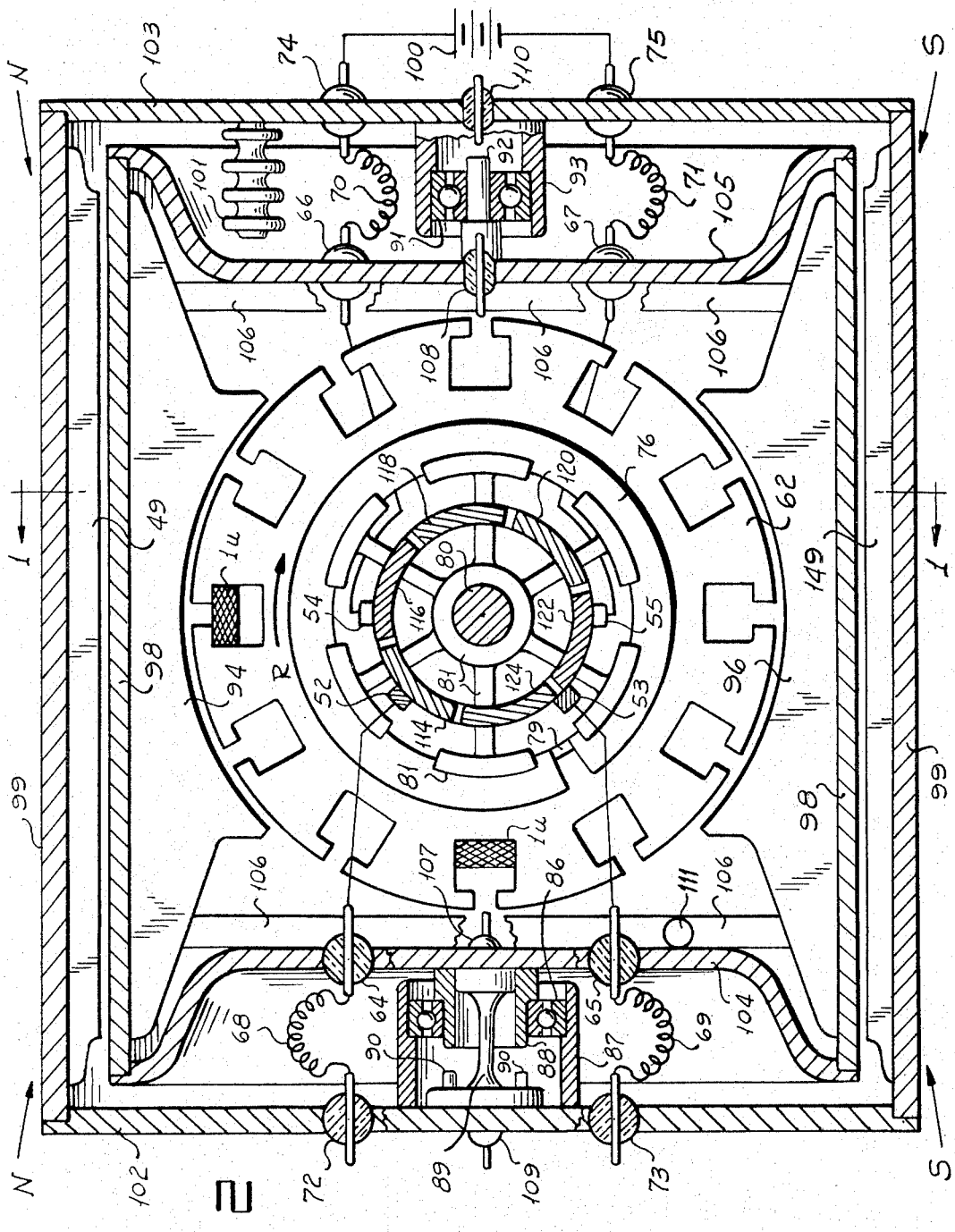

Jan. 30, 1968     T. R. QUERMANN     3,365,961
SINGLE-DEGREE-OF-FREEDOM GYROSCOPE
Filed Oct. 15, 1963     4 Sheets-Sheet 4
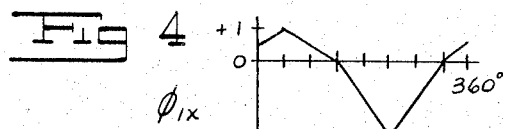
Fig 4    $\phi_{1x}$
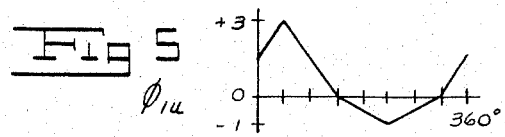
Fig 5    $\phi_{1u}$
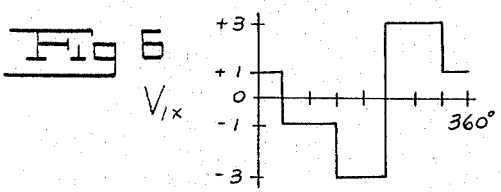
Fig 6    $V_{1x}$
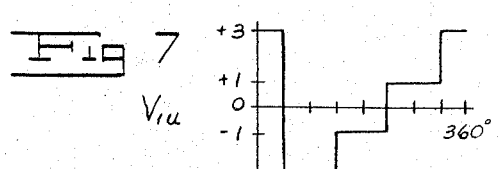
Fig 7    $V_{1u}$
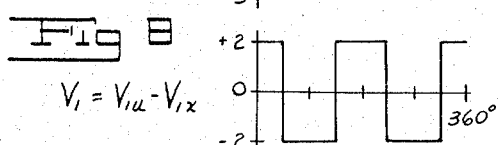
Fig 8    $V_1 = V_{1u} - V_{1x}$
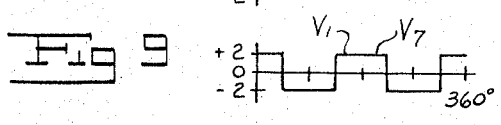
Fig 9
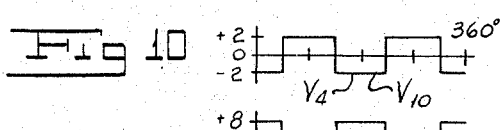
Fig 10
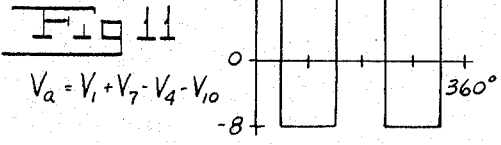
Fig 11    $V_a = V_1 + V_7 - V_4 - V_{10}$
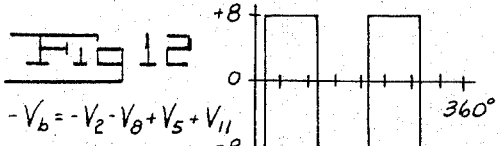
Fig 12    $-V_b = -V_2 - V_8 + V_5 + V_{11}$
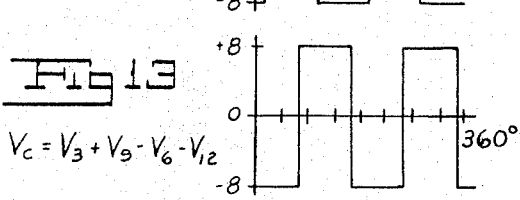
Fig 13    $V_c = V_3 + V_9 - V_6 - V_{12}$
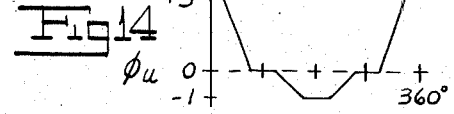
Fig 14    $\phi_u$
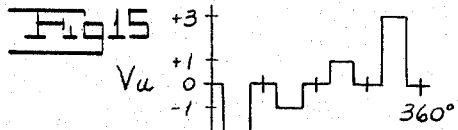
Fig 15    $V_u$
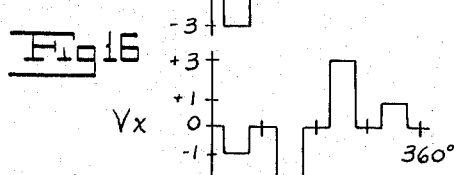
Fig 16    $V_x$
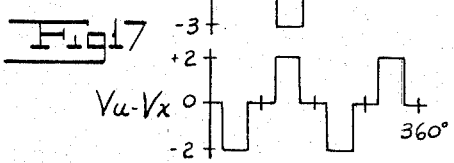
Fig 17    $V_u - V_x$
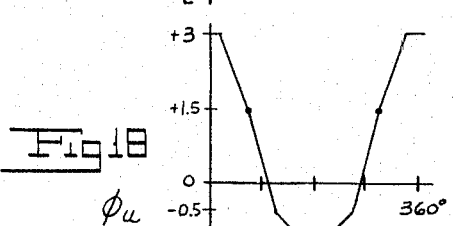
Fig 18    $\phi_u$
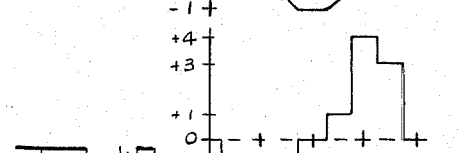
Fig 19    $V_u$
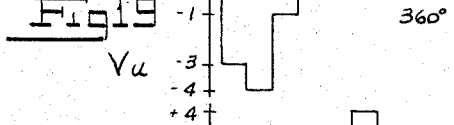
Fig 20    $V_x$
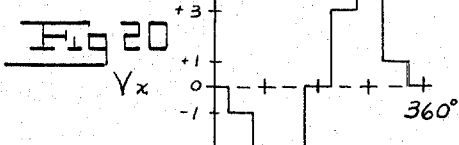
Fig 21    $V_u - V_x$
INVENTOR.
THOMAS R. QUERMANN
BY Shenier & O'Connor
ATTORNEYS

United States Patent Office 3,365,961
Patented Jan. 30, 1968

3,365,961
SINGLE-DEGREE-OF-FREEDOM GYROSCOPE
Thomas R. Quermann, Huntington Station, N.Y., assignor to United Aircraft Corporation, East Hartford, Conn., a corporation of Delaware
Filed Oct. 15, 1963, Ser. No. 316,308
27 Claims. (Cl. 74—5.7)

My invention relates to gyroscopes and more particularly to single-degree-of-freedom gyroscopes.

This application constitutes an improvement over Patent No. 3,074,283 for Single Degree Of Freedom Gyroscope.

In this patent the two armatures are magnetically isolated, which requires that one of the two poles comprise a pair of split axially spaced subpoles of the same polarity. This introduces an inherent asymmetry in the magnetic circuit of the machine. Such asymmetry can lead to slight magnetic unbalances unless extreme care is taken in manufacture and assembly. The asymmetry introduces a residual unbalance effect by virtue of the fringing fluxes. While in low precision gyroscopes the effect is for all practical purposes negligible, high precision gyroscopes require that all sources of systematic error be eliminated.

One object of my invention is to provide an improved single-degree-of-freedom gyroscope having a symmetrical magnetic structure which eliminates all systematic magnetic unbalance.

A further object of my invention is to provide an improved single-degree-of-freedom gyroscope wherein the spin motor itself is used to obtain an output signal proportional to gimbal deflection thereby eliminating the need for an auxiliary pick-off; wherein single-phase alternating-current, polyphase alternating-current, direct current or any combination thereof may be obtained as output signals; wherein linear damping and a constant damping factor is obtained by electro-magnetic effects without dependence on fluid viscosity or fluid density; and wherein the need for auxiliary torquer field structure is eliminated by virtue that the torquing winding reacts with the main field flux.

Other and further objects of my invention will appear from the following description.

In general my invention contemplates the provision of a pair of spin motor armatures mounted for common rotation on a shaft journaled in the gimbal. The armatures are not magnetically isolated but are instead coupled by a magnetic bridge so that flux may freely flow between the two armatures. The pair of armatures is wound with a conventional motor winding which links the two armatures in series aiding fashion. The two armatures are further wound with an output winding which links the armatures in series bucking fashion. The output windings preferably have a pitch of 90°. Two stationary poles are provided on the housing which are aligned with the sensitive or input axis. Each of these poles are identical. Preferably these poles each have a pitch of 90° and are spaced in close proximity to the armatures to reduce to the minimum extent possible any fringing of flux at the pole tips. The two poles couple flux only to the inner portions of the two armatures in the null position so that equal fluxes pass through the two armatures and no flux passes through the magnetic leg which connects the two armatures. If the gimbal rotates in one direction or the other, flux will flow through the magnetic leg connecting the two armatures so that a major portion of the flux of the machine will trace either an S or Z path. The voltages induced in the output winding are second harmonics; and this is the reason for providing both a pole pitch and an output winding pitch of 90°. The second harmonic voltage induced in the output winding is proportional to the magnitude and the direction of the flux in the magnetic leg connecting the two armatures and thus proportional to the direction and amount of gimbal rotation. Where a direct current output is desired, it is necessary to commutate each 90° rather than 180° as in conventional machines; and the output brushes are thus spaced apart by 90°. I provide a torquing winding mounted on the gimbal and disposed to generate flux in the magnetic leg linking the armatures. An output voltage is produced not only because of the flux flowing through the interconnecting magnetic leg but also because the current through the torquing winding reacts with the main field flux to produce a gimbal torque and consequent gimbal rotation which further magnifies the output voltage. The torquing winding may be short-circuited through a negative temperature coefficient thermistor to provide damping. For further damping I may provide areas of conductive material so mounted on the gimbal that the field flux passes therethrough.

In the accompanying drawings which form part of the instant specification and which are to be read in conjunction therewith and in which like reference numerals are used to indicate like parts in the various views:

FIGURE 2 is a side sectional view taken generally along the plane 2—2 of FIGURE 1.

FIGURES 4 and 5 show the variation with rotation of the fluxes linking the two portions of an output coil.

FIGURES 6 and 7 show corresponding variation with rotation of the generated voltages in the two portions of the coil.

FIGURE 8 shows the variation with rotation of the resultant output voltage of the coil.

FIGURE 9 shows the variation with rotation of the voltage produced by a coil which is diametrically opposed by 180° to that of FIGURES 4 through 8.

FIGURE 10 shows the variation with rotation of the voltages produced by coils having a 90° displacement from the coils of FIGURES 4 through 9.

FIGURE 11 shows the variation with rotation of a first phase output produced by the differential combination of the voltages in FIGURES 9 and 10.

FIGURE 12 shows the variation with rotation of a reversed polarity second phase output by a different group of four coils.

FIGURE 13 shows a variation with rotation of a third phase output produced by still a different group of four coils.

FIGURE 14 shows the variation with rotation of the flux linking a coil portion where either the pole pitch is 90° and the coil pitch is 45° or where the coil pitch is 90° and the pole pitch is 45°.

FIGURES 15 and 16 show the variation with rotation of the generated voltages in the two portions of a coil as in FIGURE 14.

FIGURE 17 shows the variation with rotation of the resultant output voltage of the coil of FIGURES 14 through 16.

FIGURE 18 shows the variation with rotation of the flux linking a coil portion where either the pole pitch is 90° and the coil pitch is 135° or where the coil pitch is 90° and the pole pitch is 135°.

FIGURES 19 and 20 show the variation with rotation of the generated voltages in the two portions of a coil as in FIGURE 18.

FIGURE 21 shows the variation with rotation of the resultant output voltage of a coil as in FIGURES 18 through 20.

Figure 1:
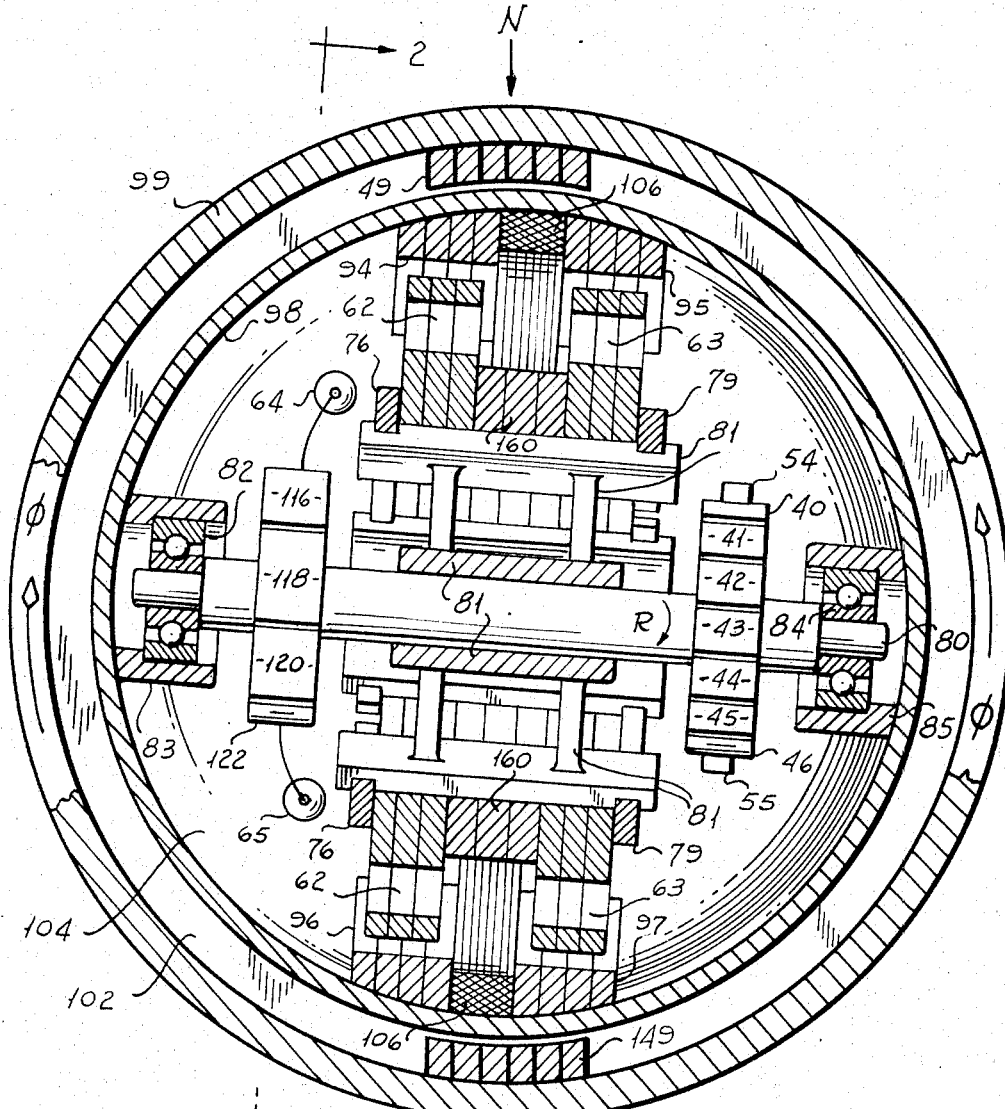
FIGURE 1 is an end sectional view taken generally along the plane 1—1 of FIGURE 2 in which the gimbal is shown rotated clockwise from its null position.

More particularly referring now to FIGURES 1 and 2, each of armatures 62 and 63 comprise a stack of laminations mounted on a spider 81 and secured by snap spring end rings 76 and 79. A magnetic bridge 160 also comprising a stack of laminations mounted on spider 81 provides a path for the flow of magnetic flux between the two armatures. Armatures 62 and 63 are each provided with twelve teeth and twelve semiclosed slots. Spider 81 comprises a hub and six pairs of legs, each pair of which supports a foot upon which are mounted armatures 62 and 63 and the magnetic bridge 160 and into which are machined recesses to receive the snap spring end rings 76 and 79. The hub of spider 81 is secured to rotor shaft 80. Mounted on shaft 80 adjacent armature 62 is an output commutator comprising six bars 114, 116, 118, 120, 122 and 124. An input commutator comprising twelve bars 37 through 48 is mounted on shaft 80 adjacent armature 63. In FIGURE 1 only bars 40 through 46 are visible. The ends of rotor shaft 80 are supported by the inner races of ball bearings 82 and 84. I provide a floated gimbal structure comprising a cylinder 98 and a pair of bowl-shaped end members 104 and 105 which are hermetically sealed to cylinder 98. The outer races of bearings 82 and 84 are supported by members 83 and 85 which are secured to the inside of cylinder 98 in diametrical opposition. The gimbal axis, which is the output axis of the gyroscope, is determined by a stub shaft 92 and a member 88 which are axially secured to the outside of the bowl-shaped end members 105 and 104 respectively. A first pair of pole shoes 94 and 96 are associated with armature 62. A second pair of pole shoes 95 and 97 are associated with armature 63. The pole shoes are secured to the inside of cylinder 98 in diametrical opposition along the input axis which is at right angles both to the spin reference axis of shaft 80 and the gimbal or output axis of stub shaft 92. Pole shoes 94 and 95 are disposed parallel to one another and couple flux to armatures 62 and 63 respectively. Pole shoes 96 and 97 are likewise disposed parallel to one another and couple flux from armatures 62 and 63 respectively. The pole shoes subtend 90° and have abruptly formed ends to reduce flux fringing. Stub shaft 92 is supported by the inner race of a ball bearing 91, the outer race of which is supported by a member 93 which is axially secured to a circular end plate 103. Output axis member 88 is supported by the inner race of a ball bearing 86, the outer race of which is supported by a member 87 which is axially secured to a circular end plate 102. A torsion bar 89 extends axially through the hollow cylindrical members 88 and 87. One end of torsion bar 89 is axially secured to the outside of the bowl-shaped end member 104; and the other end of torsion bar 89 is axially secured to end plate 102 by a pair of pins 90 which provide constraint against rotation. Circular end plates 102 and 103 are hermetically sealed to a cylindrical housing 99. Housing 99 is formed of a permanent magnetic material so magnetized as to create diametrically opposed and longitudinally extending north and south pole areas indicated generally by the reference letters N and S respectively. A longitudinally extending laminated north pole 49 is secured to the inside of housing 99 in its north pole area. A longitudinally extending laminated south pole 149 is secured to the inside of housing 99 in the south pole area. The north and south poles 49 and 149 determine the sensitive or input axis of the gyroscope. It is only when the gimbal is in its null position that the pole shoes 94 through 97 are precisely aligned with the input axis. In the null position north pole 49 couples equal fluxes only to the inner portions of pole shoes 94 and 95; and south pole 149 couples equal fluxes only from the inner portions of pole shoes 96 and 97 so that no flux flows through the magnetic bridge 160. In FIGURE 1 the gimbal is shown rotated clockwise from its null position so that three-quarters of the total machine flux traces an S path through pole shoe 94, armature 62, magnetic bridge 160, armature 63 and pole shoe 97 while one-quarter of the total machine flux traces a Z path through pole shoe 95, armature 63, magnetic bridge 160, armature 62 and pole shoe 96. The net flux through the magnetic bridge 160 is one-half the total machine flux, and produces an output voltage which is one-half the maximum output voltage. I provide a pair of output brushes 52 and 53. In the position shown in FIGURE 2, brush 52 contacts the center of commutator bar 114; and output brush 53 bridges bars 122 and 124. I provide a pair of input brushes 54 and 55. In the position shown brush 54 engages the middle of commutator bar 40 while brush 55 contacts the middle of commutator bar 46. Input brushes 54 and 55 are aligned with the midpoints of the pole shoes and thus have an angular spacing of 180°. Output brushes 52 and 53, however, have an angular spacing of only 90°. Brushes 52 through 55 are supported and resiliently maintained in contact with the input and output commutators by suitable brush rigging which may be secured to the inside of floated gimbal cylinder 98. I provide eight hermetically sealed and insulated terminals 64 through 67 and 72 through 75. Terminals 64 and 65 extend through end bowl 104; terminals 66 and 67 extend through end bowl 105; terminals 72 and 73 extend through end plate 102; and terminals 74 and 75 extend through end plate 103. Input brushes 54 and 55 are connected to terminals 66 and 67; and output brushes 52 and 53 are connected to terminals 64 and 65. Flexible leads 68 through 71 connect terminals 64 and 72, 65 and 73, 66 and 74, and 67 and 75 respectively. A signal proportional to gimbal rotation appears between terminals 72 and 73. An input excitation battery 100 is connected between terminals 74 and 75. A bellows 101 filled with pressurized gas is secured to end plate 103. The inner surfaces of poles 49 and 149 and the outer surfaces of pole shoes 94 through 97 are cylindrical to accommodate angular movement of the floated gimbal about the output axis without altering the gap which the field flux must cross. A torquing winding 106 of rectangular shape in FIGURE 2 is mounted inside the floated gimbal and extends between pole shoes 94 and 95 and also between pole shoes 96 and 97. I provide four hermetically sealed and insulated terminals 107 through 110 which extend through bowls 104 and 105 and through end plates 102 and 103 respectively. Winding 106 may be connected by conductors (not shown) to terminals 107 and 108. A pair of flexible leads (not shown) may be used to connect terminals 107 and 109 and also 108 and 110. Direct current signals applied to terminals 109 and 110 may thus exert torque about the gimbal axis in displacement gyro applications. A negative temperature coefficient thermistor 111 is mounted inside the floated gimbal on bowl 104. Winding 106 may be short-circuited through thermistor 111 for damping in rate gyro applications where no torquing signals are externally applied. As can be seen by reference to FIGURE 1 the field flux $\phi$ flows from the longitudinally extending south pole area S through the two halves of cylindrical housing 99 to the longitudinally extending north pole area N along the entire length of the housing 99. Floated cylinder 98, bowls 104 and 105, and end plates 102 and 103 should be formed of nonmagnetic material in order to avoid shunting of field flux from the armatures. The gimbal cylinder 98, at least in the region adjacent pole shoes 94 through 97, may be formed of a material having a zero or preferably slightly negative temperature coefficient of resistance. The hermetically sealed space between the housing and the floated gimbal may be filled with a buoyant fluid to float the gimbal.

Since the dimensions of the pole shoes 94 through 97 are the same and since the dimensions of the poles 49 and 149 are the same, the projected area of the gaps which flux must cross are precisely equal for north and south pole regions. Because of the inherent symmetry of the magnetic circuit the fringing fluxes cannot produce any residual magnetic unbalance since equal fringing effects are produced in both the north and south pole regions. Accordingly all sources of systematic unbalance are eliminated by virtue of symmetry of the magnetic circuit.

The input winding may comprise twelve coils connected as a full-pitch, progressive, double-layer, singly re-entrant, lap winding having two coil sides per slot, as more fully shown and described in the above-mentioned patent. The input winding is connected to input commutator bars 37 through 48. The input winding is wound on the two armatures 62 and 63 in the same manner as on conventional machines having air duct spacing between axially spaced stacks of laminations. A centrifugal switch may be also mounted on the armatures as shown in the above-mentioned patent to determine precisely its speed of rotation and hence the angular momentum of the gyroscope when excited by direct current.

Figure 3A:
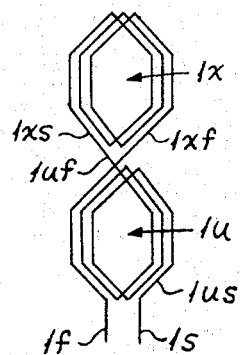
FIGURE 3a is a schematic view showing the two portions of an output winding coil.
Figure 3B:
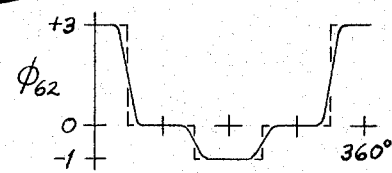
FIGURE 3b shows the distribution of air-gap flux for one armature.
Figure 3:
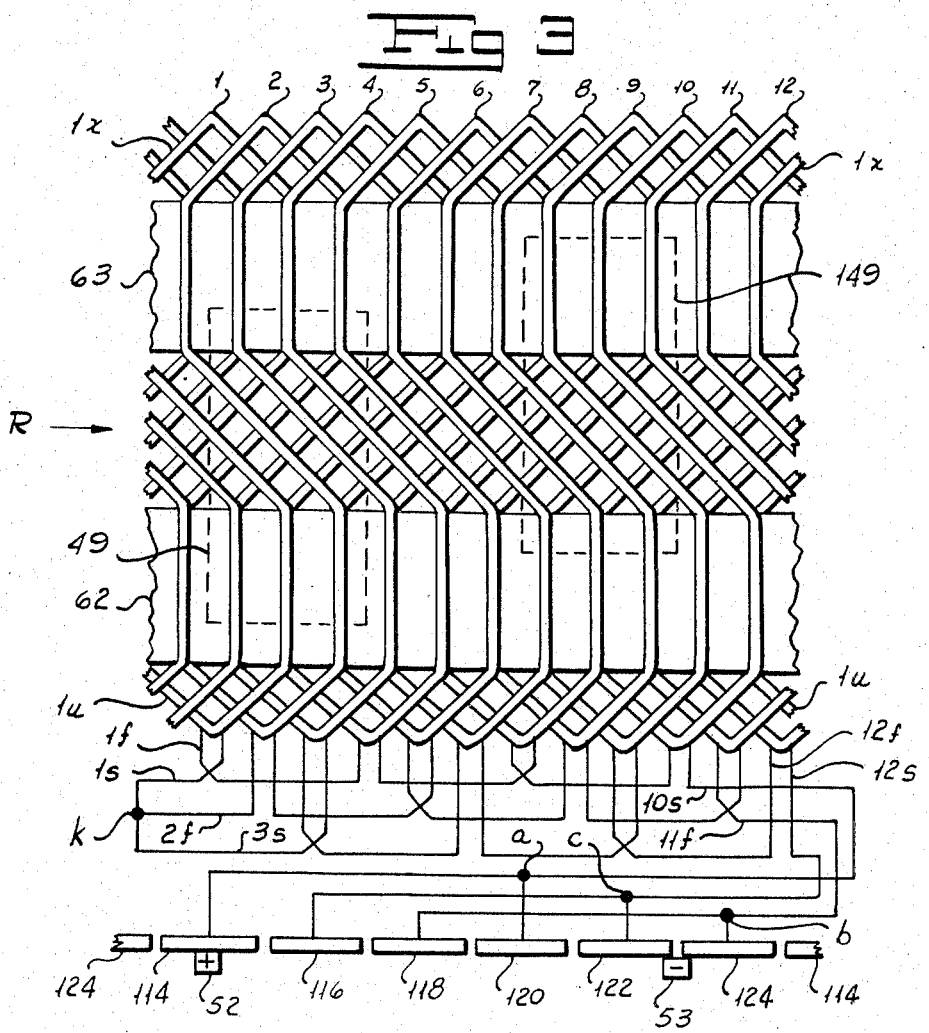
FIGURE 3 is a developed view of the output winding which links the pair of spin motor armatures in series bucking fashion.

Referring now to FIGURE 3 the output winding comprises twelve coils 1 through 12 which are each formed in the shape of a figure "8." Each of coils 1 to 12 has a pitch of 90°. Since there are twelve slots and two poles, each of coils 1 through 12 spans three slots. The output winding is a double layer lap winding having two coil sides per slot. The finish 1f of coil 1 is connected to the finish of coil 4. The start of coil 4 is connected to the start of coil 7. The finish of coil 7 is connected to the finish of coil 10. The start 10s of coil 10 provides a first phase output $a$ which is connected to commutator bars 114 and 120. Coils 2, 5, 8, and 11 are similarly connected finish-to-finish and start-to-start so that the finish 11f of coil 11 provides a reversed polarity second phase output $b$ which is connected to commutator bars 118 and 124. Coils 3, 6, 9, and 12 are similarly connected finish-to-finish and start-to-start so that the start 12s of coil 12 provides a normal polarity third phase output $c$ which is connected to commuator bars 116 and 122. The start 1s of coil 1, the finish 2f of coil 2 and the start 3s of coil 3 are connected to a common termination $k$ comprising the neutral of the three Y-connected phases. The output winding, in contradistinction to conventional machines, provides only a single path instead of two parallel paths. Let us trace coil 3. From its start 3s, coil 3 proceeds upwardly and to the right over the end turns of coils 4 and 5 to armature 62, thence upwardly through a slot of armature 62 over coil 6, thence upwardly and to the left in the space between the armatures over coils 5, 4, 3, 2, and 1 to armature 63, thence upwardly through a slot of armature 63 over coil 12. The end connection for coil 3 proceeds upwardly and to the right over coils 1 and 2, then downwardly to the right under coils 4 and 5 to armature 63 again. Coil 3 then proceeds downwardly through a slot of armature 63 under coil 6, thence downwardly and to the left in the space between the armatures under coils 5, 4, 3, 2, and 1 to armature 62, thence downwardly through a slot of armature 62 under coil 12 and finally downwardly and to the right under coils 1 and 2 to the finish of coil 3.

Referring now to FIGURE 3a each of the output coils may be considered as comprising two portions each of which is associated with only one of the armatures and which are connected in series opposition. For example, coil 1 may be considered as comprising a first portion 1x which links only armature 63 and a second portion 1u which links only armature 62. Thus the start 1s of coil 1 is connected to the start 1us of coil 1u, the finish 1uf of coil 1u is connected to the start 1xs of coil 1x, and the finish 1xf of coil 1x is connected to the finish 1f of coil 1. From the figure it will be seen that coil 1u is provided with 2½ turns while coil 1x is provided with 3 turns. The additional half turn of coil 1u is provided by the conductor connecting the finish 1xf of coil 1x to the finish 1f of the composite figure 8 coil 1. Thus in FIGURE 3 coil 1x comprises those coil sides of coil 1 in the slots of armature 63 while coil 1u represents those coil sides of coil 1 in the slots of armature 62.

In the 0° position shown one coil side of coil 1u is centrally positioned under pole shoe 94; and one coil side of coil 1x is centrally positioned under pole shoe 95. For the direction of rotation R indicated by the arrows in FIGURES 1 through 3 the flux in both coils 1u and 1x is increasing. As previously indicated for the angular rotation from the null position shown in FIGURE 1 the maximum flux for coils under pole shoes 94 and 97 is three times that of coils under pole shoes 95 and 96.

Referring now to FIGURE 3b there is shown the distribution of air-gap flux around the periphery of armature 62. The leading coil side of coil 1u under pole shoe 94 is shown at the 0° position. Between 315° and 45° the air-gap flux density is +3. Between 45° and 135° and also between 225° and 315° the flux in the air-gap is zero. Between 135° and 225° the air-gap flux density is −1. The foregoing is shown by the broken line and assumes no flux tufting at the ends of the pole shoes. However some flux tufting will occur; and the solid line shows the actual air-gap flux density when the pole shoes are somewhat shortened to subtend slightly less than 90°. It will be noted that at 135° and 225° the flux density is approximately −0.5; and at 45° and 315° the density has approximately a 1.5 value.

Referring now to FIGURES 4 and 5, during rotation of armatures 62 and 63 from the 0° position shown to 45° the flux linking coil 1u increases linearly from +1.5 to +3 and the flux linking coil 1x increases linearly from +0.5 to +1. From 45° to 135° the flux linking coil 1u decreases linearly from +3 to 0; and the flux linking coil 1x decreases linearly from +1 to 0. Between 135° and 225° the flux linking coil 1x decreases linearly from 0 to −3; and the flux linking coil 1u decreases linearly from 0 to −1. Between 225° and 315° the flux linking coil 1x increases linearly from −3 to 0; and the flux linking coil 1u increases linearly from −1 to 0. Between 315° and 360° the flux linking coil 1x increases from 0 to +0.5; and the flux linking coil 1u increases linearly from 0 to +1.5.

Referring now to FIGURES 6 and 7, the voltages induced in coils 1x and 1u are proportional to the rate of change of the flux linking the coils. Accordingly between 315° and 45° coil 1x produces a constant voltage of +1, while coil 1u produces a constant voltage of +3. Between 45° and 135° coil 1x produces a constant voltage of −1, while coil 1u produces a constant voltage of −3. Between 135° and 225° coil 1x produces a constant voltage of −3 while coil 1u produces a constant voltage of −1. Between 225° and 315° coil 1x produces a constant voltage of +3 while coil 1u produces a constant voltage of +1.

Referring now to FIGURE 8, the net voltage produced by coil 1 is the differential combination of the voltages produced by coil portions 1u and 1x. Accordingly coil 1 provides a constant voltage of +2 between 315° and 45° and also between 135° and 225°, and a constant voltage of −2 between 45° and 135° and also between 225° and 315°.

Referring now to FIGURE 9, the voltage produced by coil 7 is the same as coil 1.

Referring now to FIGURE 10, the voltages produced by each of coils 4 and 10 are out of phase with those produced by coils 1 and 7 and comprise a square voltage wave alternating between +2 and −2.

Referring now to FIGURE 11 the net voltage of phase $a$ is $$V_a = V_1 + V_7 - V_4 - V_{10}$$

This voltage is in phase with the voltages produced by coils 1 and 7 and out of phase with voltages produced by coils 4 and 10 and comprises a square voltage wave alternating between +8 and −8.

Referring now to FIGURE 12 the reversed polarity voltage of phase $b$ is $$-V_b = -V_2 - V_8 + V_5 + V_{11}$$

This voltage is in phase with the voltages produced by value of +8 between 15° and 105° and also between 195° and 285° and having a constant value of −8 between 105° and 195° and also between 285° and 15°.

Referring now to FIGURE 13 the normal polarity voltage of phase $c$ is $$V_c = V_3 + V_9 - V_6 - V_{12}$$

This comprises a square voltage wave having a constant value of +8 between 75° and 165° and also between 255° and 345° and having a constant value of −8 between 165° and 255° and also between 345° and 75°.

Thus it will be seen from FIGURES 11, 12, and 13 that the phase voltages $V_a$, $V_b$, and $V_c$ have respective mechanical phase shifts of 60°. Since these voltages are of double the fundamental frequency, they form a balanced three-phase system having relative electrical phase displacements of 120°.

In FIGURES 4 through 13 it is assumed that there is no flux tufting adjacent the ends of the pole shoes and that the pattern of flux around the periphery of the armatures conforms to the broken curve of FIGURE 3b.

Figure 24:
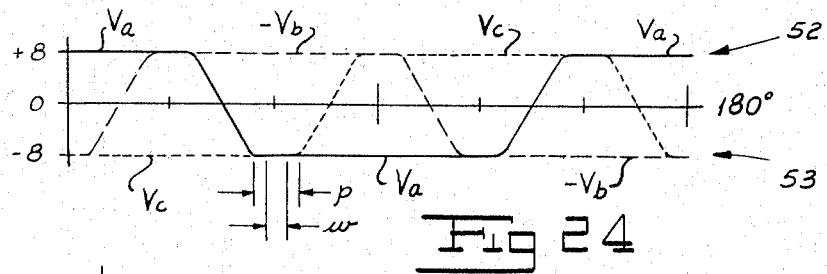
FIGURE 24 shows the superposition of the three phase voltages of FIGURES 11 through 13 to provide a ripple-free, full-wave, rectified DC output voltage.

FIGURE 24 shows the actual phase voltages produced by the flux pattern shown in the continuous curve of FIGURE 3b. In FIGURE 24 it will be seen that the phase voltages no longer comprise pure square waves but are instead of trapezoidal form. Because of the double frequency of the three-phase output voltage it is necessary to commutate twice each revolution. It will be noted that each of the phase terminals $a$, $b$, and $c$ are connected to two commutator bars; and the output brushes 52 and 53 are spaced apart 90°. In the 0° position shown brush 52 engages the middle of segment 114 which is connected to phase $a$; and brush 53 bridges segments 122 and 124. Upon rotation of the armature in the direction shown brush 53 breaks contact with the phase $b$ segment 124 and engages the phase $c$ segment 122. At 30° brush 52 shifts from phase $a$ to phase $b$; at 60° brush 53 shifts from phase $c$ to phase $a$; at 90° brush 52 shifts from phase $b$ to phase $c$; at 120° brush 53 shifts from phase $a$ to phase $b$; at 150° brush 52 shifts from phase $c$ to phase $a$ again; and at 180° brush 53 shifts from phase $b$ to phase $c$ again. It will be seen that even with the tufting of flux at the ends of the pole shoes an appreciable overlap of 15° exists where adjacent commutator bars have the same voltage. The permissible width $p$ for ripple-free commutation should be wider than the net width $w$ of the brushes. The net width is equal to the difference between the actual width of the brushes and the spacing between commutator segments. It will be seen that brush 52 receives a constant voltage of +8 and brush 53 receives a constant voltage of −8; and neither brush contains any ripple voltage. By connecting the output windings in a Y, the voltage difference between brushes 52 and 53 represents the resultant of two of the three phases in series. One of the three phases provides a redundancy for switching between commutator segments so that the two adjacent segments undergoing commutation have the same voltage for an appreciable interval permitting the generation of a ripple-free output.

Because of the flux tufting at the ends of the pole shoes, such shoes should preferably subtend slightly less than 90° so that the flux densities at the armature decay half way to zero at points separated by 90°. The configuration shown constitutes the preferred embodiment of my invention. However it is possible to vary either the coil pitch or the pole pitch from the optimum value of 90° each.

FIGURE 14 shows the flux $\phi_u$ linking a coil portion of armature 62 where the pole pitch is 90° and the coil pitch is only 45°, assuming no flux tufting. At 0°, the coil is assumed to be centrally positioned under the pole shoe 94. From 0° to 22.5° the flux is constant at a value of +3. From 22.5° to 67.5° the flux decays linearly to 0. Between 67.5° and 112.5° the flux remains constant at 0. Between 112.5° and 157.5° the flux decreases linearly from 0 to −1. From 157.5° to 202.5° the flux remains constant at −1. Between 205° and 247.5° the flux increases linearly from −1 to 0. Between 247.5° and 292.5° the flux remains constant at 0. Between 292.5° and 337.5° the flux increases linearly from 0 to +3. Between 337.5° and 360° the flux remains constant at +3.

Referring now to FIGURE 15 the corresponding voltage $V_u$ produced by the changing flux linkages of FIGURE 14 is constant at −3 between 22.5° and 67.5°. Between 112.5° and 157.5° the voltage has a constant value of −1. Between 202.5° and 247.5° $V_u$ has a constant value of +1. Between 292.5° and 337.5° the voltage has a constant value of +3. Elsewhere the voltage $V_u$ is zero.

Referring now to FIGURE 16, the corresponding voltage $V_x$ produced in a coil portion aligned with that of FIGURES 14 and 15 but linking armature 63 has a constant value of −1 between 22.5° and 67.5°, a constant value of −3 between 112.5° and 157.5°, a constant value of +3 between 202.5° and 247.5° and a constant value of +1 between 292.5° and 337.5°. Elsewhere the voltage $V_x$ is 0.

Referring now to FIGURE 17, the differential combination $V_u - V_x$ comprising the net voltage produced by one figure 8 coil having a pitch of 45° has a value of +2 between 112.5° and 157.5° and also between 292.5° and 337.5°, and has a constant value of −2 between 22.5° and 67.5°, and also between 202.5° and 247.5°. Elsewhere the differential voltage has a value of 0.

The same curves 14 and 17 obtain if the coil pitch is 90° and the pole pitch is only 45°.

Referring now to FIGURE 18, there is shown the flux $\phi_u$ linking a coil portion of armature 62 where the pole pitch is 90° and the coil pitch is 135°. It is again assumed that at 0° the coil is centrally positioned under pole shoe 94 and no flux-fringing occurs. Between 0° and 22.5° the flux is constant at +3. Between 22.5° and 67.5° the flux decays linearly from +3 to +1.5. Between 67.5° and 112.5° the flux decays linearly with a steeper slope from 1.5 to −0.5. Between 112.5° and 157.5° the flux decays linearly with a very shallow slope from −0.5 to −1. Between 157.5° and 202.5° the flux remains constant at −1. Between 202.5° and 247.5° the flux increases linearly from −1 to −0.5. Between 247.5° and 292.5° the flux increases linearly from −0.5 to +1.5. Between 292.5° and 337.5° the flux increases linearly from +1.5 to +3. Between 337.5° and 360° the flux remains constant at +3.

Referring now to FIGURE 19 there is shown the corresponding voltage $V_u$ produced by the changing flux of FIGURE 18. The voltage $V_u$ is constant at −3 between 22.5° and 67.5°. Between 67.5° and 112.5° the voltage is constant at −4. Between 112.5° and 157.5° the voltage is constant at −1. Between 202.5° and 247.5° the voltage is constant at +1. A constant voltage of +4 is produced between 247.5° and 292.5°. A constant voltage of +3 is produced between 292.5° and 347.5°. Elsewhere no voltage is produced.

Referring now to FIGURE 20 the voltage $V_x$ produced by a coil portion aligned with that of FIGURES 18 and 19 but linking armature 63 has a value of −1 between 22.5° and 67.5°, a value of −3 between 112.5° and 157.5°, a value of +3 between 202.5° and 247.5°, and a value of +1 between 292.5° and 337.5°. Elsewhere the voltage $V_x$ is the same as $V_u$.

Referring now to FIGURE 21, the differential combination $V_u-V_x$ representing the net voltage produced by a figure 8 coil having a pitch of 135° is the same as shown in FIGURE 17.

FIGURES 18 through 21 apply with equal force to a configuration where the coil pitch is 90° and the pole pitch is 135°.

From FIGURES 17 through 21 it will be noted that either increasing or decreasing by 45° either the pole pitch or the coil pitch from their optimum values of 90° each results in an output voltage wave form having regions 22½° wide of no voltage interposed between the alternate positive and negative voltage outputs.

Figure 22:
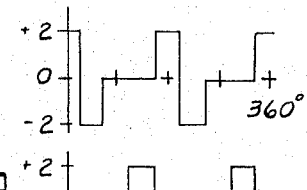
FIGURE 22 shows the variation with rotation of the resultant output voltage of a coil where either the pole pitch and the coil pitch are 45° or where the pole pitch and the coil pitch are 135°.

Referring now to FIGURE 22 I have shown the resultant output voltage produced by a figure 8 coil linking both armatures where the pole pitch and the coil pitch are both 45° or where the coil pitch and the pole pitch are both 135°. It is assumed that a coil is centrally positioned under the north pole shoes at 22.5° and that there is no flux-fringing. Between 337.5° and 22.5° and between 157.5° and 202.5° the voltage is constant at +2. Between 22.5° and 67.5° and between 202.5° and 247.5° the voltage is constant at −2. Elsewhere the voltage is zero.

Figure 23:
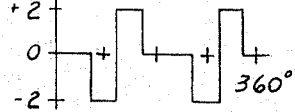
FIGURE 23 shows the variation with rotation of the resultant output voltage of a coil where either the pole pitch is 45° and the coil pitch is 135° or where the coil pitch is 45° and the pole pitch is 135°.

Referring now to FIGURE 23, there is shown the resultant output voltage produced by a figure 8 coil linking both armatures where the pole pitch is 45° and the coil pitch is 135° or where the coil pitch is 135° and the pole pitch is 45°. It is assumed that a coil is centrally positioned under the north pole shoe at 22.5° and that there is no fringing of flux. Between 67.5° and 112.5° and between 247.5° and 292.5° the voltage is constant at −2. Between 112.5° and 157.5° and between 292.5° and 337.5° the voltage is constant at +2. Elsewhere the voltage is zero.

The voltage curves of FIGURES 17 and 21 through 23 would not be useful for providing a direct current output. The curves of FIGURES 17 and 21 would, however, be substantially as useful as those of FIGURES 11 through 13 for producing either a single-phase or a three-phase alternating current output, especially where filters or other tuned circuits are employed to produce a substantially sinusoidal output, since the curves of FIGURES 17 and 21 contain almost the same fundamental component as the pure square waves of FIGURES 11 through 13. The curves of FIGURES 22 and 23 however contain considerably less fundamental component than the curves of FIGURES 17 and 21.

It will be noted from FIGURES 17 and 21 that a coil mechanically displaced by 45° would produce a voltage wave form which when combined with the voltage curves of FIGURES 17 and 21 would yield a resultant square wave voltage which is of four times the rotational frequency of the armature. It will be also noted from FIGURES 22 and 23 that a coil mechanically displaced by 90° would produce a voltage wave form which when combined with the voltage curves of FIGURES 22 and 23 would yield a resultant square wave voltage which is four times the rotational frequency of the armature. In order to obtain a direct current output it would then be necessary to commutate every 45°. Accordingly the armature would be provided with twenty-four slots; each of the three phases would have eight coils; the commutator would be provided with twelve bars; and each phase would be connected to four of the commutator bars.

In operation of my improved single-degree-of-freedom gyroscope as a rate gyro, input excitation voltage from battery 100 through flexible leads 70 and 71 is coupled to the input brushes 54 and 55 energizing the spin motor. In the absence of an angular velocity about the sensitive or input axis, torsion bar 89 centers the gimbal so that no flux flows through the magnetic bridge 160 and the output voltage at brushes 52 and 53 is zero. Winding 106 may be left open-circuited or may be short-circuited through the negative temperature coefficient thermistor 111. Upon rotation of the gyroscope about the input axis, the gimbal rotates from its null position until the restoring torque exerted by torsion bar 89 opposes the precessional torque. This causes a portion of the total machine flux to flow through the magnetic bridge 160, providing and output voltage. Rotation of the gimbal changes the flux linkages in the conductive areas of gimbal cylinder 98 in the regions under the poles 49 and 149. Eddy currents flow which not only tend to prevent any change in the flux through the magnetic bridge 160 but also oppose rotation of the gimbal. Changes in flux through the magnetic bridge 160 also induce voltages in winding 106. If winding 106 is short-circuited either directly or through thermistor 111 then currents flow in the winding in such direction to oppose changes in flux through the magnetic bridge 160 and to oppose rotation of the gimbal. The damping factor may be adjusted by varying the resistance of thermistor 111.

In operation of my improved single degree of freedom as a displacement gyro, one end of winding 106 is connected to terminal 107. The other end of winding 106 is connected either directly or in series with thermistor 111 to terminal 108. Torsion bar 89 may be eliminated or pins 90 may be removed so that no center torques are exerted on the gimbal. Terminals 109 and 110 are connected to a source of torquing current. If a torquing signal is applied, the current flowing in winding 106 produces flux which, for example, may flow to the right (FIGURE 1) through bridge 160 and augment that of pole shoes 94 and 97 while diminishing that of pole shoes 95 and 96. This immediately produces an output voltage proportional to the flux through magnetic bridge 160. There is also produced a flux density unbalance in the air-gaps producing a torque which causes the gimbal to rotate clockwise in FIGURE 1 further increasing the flux through magnetic bridge 160 and correspondingly the output voltage. As is well known to the art the output voltage is coupled to a servo motor which rotates the gyro about its input axis thereby producing precessional torques on the gimbal. A null is reached when the gimbal is rotated slightly counterclockwise of the neutral position. With the gimbal displaced counterclockwise of the neutral position, the tendency of the input winding 106 to produce S path flux is counteracted by the tendency of the differential air-gap reluctances to produce Z path flux so that the net flux through the magnetic bridge 160 is zero.

It will be noted that in rate gyroscope applications the damping effect both of the conductive areas of float cylinder 98 and of the short-circuited winding 106 upon the voltage at terminals 72 and 73 exceeds the mechanical damping upon the gimbal. Eddy current flow either in the gimbal cylinder or in winding 106 not only imposes a mechanical torque but also prevents a change in flux through the magnetic bridge 160. In my rate gyro the gimbal may be less than critically damped yet the output voltage at terminals 72 and 73 may be critically damped. My improved single-degree of-freedom gyroscope is preferably a two-pole machine since the field flux is used not only in rotating the spin motor but also in providing a gimbal output. Pole shoes 94 through 97 provide a transition for the flux flowing from poles 49 and 149 to armatures 62 and 63 which accommodates both the rotation of the spin motor and the rotation of the gimbal. Such pole shoes, furthermore, isolate the torque necessary for driving the spin motor from the gimbal bearings.

It will be seen that I have accomplished the objects of my invention. Both the field structure and the armatures are magnetically symmetrical eliminating all possibility of systematic magnetic unbalance due to flux-fringing.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A single-degree-of-freedom gyroscope including in combination a rotor comprising a pair of axially spaced spin motor armatures and an axially disposed magnetic bridge formed of a permeable material, interconnecting said armatures, a pair of spin motor salient field poles of similar form but opposite polarity, a gimbal, means journaling the rotor in the gimbal, means mounting the gimbal for rotation relative to the field poles, the field poles each subtending an amount sufficiently less than 90 mechanical degrees that the field flux decays by half at points separated by 90 mechanical degrees.

2. A single-degree-of-freedom gyroscope including in combination a rotor comprising a pair of axially spaced spin motor armatures and an axially disposed magnetic bridge formed of a permeable material interconnecting said armatures, a pair of spin motor salient field poles of similar form but opposite polarity, a gimbal, means journaling the rotor in the gimbal, means mounting the gimbal for rotation relative to the field poles, the field poles each subtending slightly less than 90 mechanical degrees.

3. A single-degree-of-freedom gyroscope including in combination a rotor comprising a pair of axially spaced spin motor armatures and an axially disposed magnetic bridge formed of a permeable material interconnecting said armatures, a pair of spin motor salient field poles of similar form but opposite polarity, a gimbal, means journaling the rotor in the gimbal, means mounting the gimbal for rotation relative to the field poles, the field poles each subtending approximately 90 mechanical degrees.

4. A single-degree-of-freedom gyroscope including in combination a rotor comprising a pair of axially spaced spin motor armatures and an axially disposed magnetic bridge formed of a permeable material interconnecting said armatures, a pair of spin motor salient field poles of similar form but opposite polarity, a gimbal, means journaling the rotor in the gimbal, means mounting the gimbal for rotation relative to the field poles, the field poles providing uniformly small air-gaps and having sharply formed ends to reduce flux-fringing adjacent such ends.

5. A single-degree-of-freedom gyroscope including in combination a rotor comprising a pair of axially spaced spin motor armatures, an axially disposed magnetic bridge formed of a permeable material interconnecting said armatures, a pair of spin motor salient field poles of similar form but opposite polarity, a gimbal, means journaling the rotor in the gimbal, means mounting the gimbal for rotation relative to the field poles, and an area of electrically conductive material mounted on the gimbal and interposed between a field pole and the armature.

6. A single-degree-of-freedom gyroscope including in combination a rotor comprising a pair of axially spaced spin motor armatures and an axially disposed magnetic bridge formed of a permeable material interconnecting said armatures, a pair of spin motor salient field poles of similar form but opposite polarity, a gimbal, means journaling the rotor in the gimbal, means mounting the gimbal for rotation relative to the field poles, and a winding mounted on the gimbal and linking the magnetic bridge.

7. A single-degree-of-freedom gyroscope including in combination a rotor comprising a pair of axially spaced spin motor armatures and an axially disposed magnetic bridge formed of a permeable material interconnecting said armatures, a pair of spin motor salient field poles of similar form but opposite polarity, a gimbal, means journaling the rotor in the gimbal, and means mounting the gimbal for rotation relative to the field poles.

8. A single-degree-of-freedom gyroscope including in combination a rotor comprising a pair of axially spaced spin motor armatures and an axially disposed magnetic bridge formed of a permeable material interconnecting said armatures, a gimbal, a pair of spin motor salient field poles of similar form but opposite polarity, means journaling the rotor in the gimbal, means mounting the gimbal for rotation relative to the field poles, and two pairs of transition poles formed of a permeable material mounted on the gimbal and interposed between the field poles and the armatures, the transition poles each subtending an amount sufficiently less than 90 mechanical degrees that the armature flux decays by half at points separated by 90 mechanical degrees.

9. A single-degree-of-freedom gyroscope including in combination a rotor comprising a pair of axially spaced spin motor armatures and an axially disposed magnetic bridge formed of a permeable material, interconnecting said armatures, a gimbal, a pair of spin motor salient field poles of similar form but opposite polarity, means journaling the rotor in the gimbal, means mounting the gimbal for rotation relative to the field poles, and two pairs of transition poles formed of a permeable material mounted on the gimbal and interposed between the field poles and the armatures, the transition poles each subtending slightly less than 90 mechanical degrees.

10. A single-degree-of-freedom gyroscope including in combination a rotor comprising a pair of axially spaced spin motor armatures and an axially disposed magnetic bridge formed of a permeable material interconnecting said armatures, a gimbal, a pair of spin motor salient field poles of similar form but opposite polarity, means journaling the rotor in the gimbal, means mounting the gimbal for rotation relative to the field poles, and two pairs of transition poles formed of a permeable material mounted on the gimbal and interposed between the field poles and the armatures, the transition poles each subtending approximately 90 mechanical degrees.

11. A single-degree-of-freedom gyroscope including in combination a rotor comprising a pair of axially spaced spin motor armatures and an axially disposed magnetic bridge formed of a permeable material interconnecting said armatures, a gimbal, a pair of spin motor salient field poles of similar form but opposite polarity, means journaling the rotor in the gimbal, means mounting the gimbal for rotation relative to the field poles, and two pairs of transition poles formed of a permeable material mounted on the gimbal and interposed between the field poles and the armatures, the air-gaps between the transition poles and the armatures being uniformly small, and the transition poles having sharply formed ends to reduce flux-fringing adjacent such ends.

12. A single-degree-of-freedom gyroscope including in combination a rotor comprising a pair of axially spaced spin motor armatures and an axially disposed magnetic bridge formed of a permeable material interconnecting said armatures, a gimbal, a pair of spin motor salient field poles of similar form but opposite polarity, means journaling the rotor in the gimbal, means mounting the gimbal for rotation relative to the field poles, two pairs of transition poles formed of a permeable material mounted on the gimbal and interposed between the field poles and the armatures, and areas of electrically conductive material mounted on the gimbal and interposed between the field poles and the transition poles.

13. A single-degree-of-freedom gyroscope including in combination a rotor comprising a pair of axially spaced spin motor armatures and an axially disposed magnetic bridge formed of a permeable material interconnecting said armatures, a gimbal, a pair of spin motor salient field poles of similar form but opposite polarity, means journaling the rotor in the gimbal, means mounting the gimbal for rotation relative to the field poles, two pairs of transition poles formed of a permeable material mounted on the gimbal and interposed between the field poles and the armatures, and a winding mounted on the gimbal and linking the magnetic bridge.

14. A single-degree-of-freedom gyroscope including in combination a rotor comprising a pair of axially spaced spin motor armatures and an axially disposed magnetic bridge formed of a permeable material interconnecting said armatures, a gimbal, a pair of spin motor salient field poles of similar form but opposite polarity, means journaling the rotor in the gimbal, means mounting the gimbal for rotation relative to the field poles, two pairs of transition poles formed of a permeable material mounted on the gimbal and interposed between the field poles and the armatures.

15. A single-degree-of-freedom gyroscope including in combination a rotor comprising a pair of axially spaced spin motor armatures and axially disposed magnetic bridge formed of a permeable material interconnecting said armatures, a gimbal, means journaling the rotor in the gimbal, spin motor field structure, and means mounting the gimbal for rotation relative to the field structure.

16. In a single-degree-of-freedom gyroscope, a two-pole spin motor including a rotor comprising a pair of axially spaced spin motor armatures and an axially disposed magnetic bridge formed of a permeable material interconnecting said armatures, the armatures being wound with output coils of a figure 8 form which link the armatures in series-bucking relationship, the coils having a pitch of approximately 90 mechanical degrees, each coil comprising a first coil portion linking one armature and a second coil portion linking the other armature, and the two coil portions being connected in series opposition.

17. In a single-degree-of-freedom gyroscope, a two-pole spin motor including a rotor comprising a pair of axially spaced spin motor armatures and an axially disposed magnetic bridge formed of a permeable material interconnecting said armatures, the armatures being wound with output coils of a figure 8 form which link the armatures in series-bucking relationship, and the coils having a pitch of exactly 90 mechanical degrees.

18. In a single-degree-of-freedom gyroscope, a two-pole spin motor including a rotor comprising a pair of axially spaced spin motor armatures and an axially disposed magnetic bridge formed of a permeable material interconnecting said armatures, the armatures being wound with output coils of a figure 8 form which link the armatures in series-bucking relationship, and the coils having a pitch of approximately 90 mechanical degrees.

19. In a single-degree-of-freedom gyroscoe, a two-pole spin motor comprising an armature provided with twelve coils, means comprising the first and fourth and seventh and tenth coils for providing a first phase output, means comprising the second and fifth and eighth and eleventh coils for providing a second phase output, and means comprising the third and sixth and ninth and twelfth coils for providing a third phase output, the first and seventh coils being connected with reversed polarity in series with the fourth and tenth coils, the fifth and eleventh coils being connected with reversed polarity in series with the second and eighth coils, the third and ninth coils being connected with reversed polarity in series with the sixth and twelfth coils, and the three phase outputs being connected in Y.

20. In a single-degree-of-freedom gyroscope, a two-pole spin motor comprising an armature provided with twelve coils, means comprising the first and fourth and seventh and tenth coils for providing a first phase output, means comprising the second and fifth and eighth and eleventh coils for providing a second phase output, and means comprising the third and sixth and ninth and twelfth coils for providing a third phase output.

21. In a single-degree-of-freedom gyroscope, a two-pole spin motor comprising an armature provided with coils generating a three-phase output, a commutator provided with six bars, means connecting a first phase to the first and fourth bars, means connecting a second phase to the second and fifth bars, means connecting the third phase to the third and sixth bars, and a brush engaging the commutator and subtending appreciably less than 30 mechanical degrees.

22. In a single-degree-of-freedom gyroscope, a two-pole spin motor comprising an armature provided with coils generating a three-phase output, a commutator provided with six bars, means connecting a first phase to the first and fourth bars, means connecting a second phase to the second and fifth bars, and means connecting the third phase to the third and sixth bars.

23. In a single-degree-of-freedom gyroscope as in claim 22, a pair of brushes engaging the commutator at points separated by approximately 90 mechanical degrees.

24. In a single-degree-of-freedom gyroscope as in claim 22, wherein the armature coils are connected in star.

25. In a single-degree-of-freedom gyroscope, a spin motor comprising a pair of salient field poles of similar form but opposite polarity each subtending approximately 90 mechanical degrees and an armature provided with a winding having four poles.

26. A single-degree-of-freedom gyroscope including in combination a spin motor armature, a gimbal, means journaling the armature in the gimbal, a pair of spin motor salient field poles of similar form but opposite polarity, and means mounting the gimbal for rotation relative to the salient field poles.

27. A single-degree-of-freedom gyroscope including in combination a rotor comprising a pair of axially spaced spin motor armatures and an axially disposed magnetic bridge formed of a permeable material interconnecting said armatures, a gimbal, two-pole spin motor field structure comprising a pair of salient poles of similar form but opposite polarity, means journaling the rotor in the gimbal, means mounting the gimbal for rotation relative to the field poles, two pairs of transition poles formed of a permeable material mounted on the gimbal and interposed between the field poles and the armatures, the transition poles each subtending approximately 90 mechanical degrees, twelve output coils of a figure 8 form and a pitch of approximately 90 mechanical degrees linking the armatures in series-bucking relationship, means connecting the coils, in four-pole three-phase star, a commutator provided with six bars, means connecting each phase to a respective pair of diametrically opposing bars, and a pair of brushes each subtending appreciably less than 30 mechanical degrees and engaging the commutator at points separated by approximately 90 mechanical degrees.

References Cited

UNITED STATES PATENTS

| | | | |
|---|---|---|---|
| 1,800,028 | 4/1931 | Merrill | 310—160 |
| 1,949,504 | 3/1934 | Von Platen | 310—223 |
| 2,378,858 | 6/1945 | Mehan | 74—5 |
| 2,588,607 | 3/1952 | Barkalow | 74—5.47 |
| 2,720,602 | 10/1955 | Dolude | 310—74 |
| 2,857,534 | 10/1958 | Beach | 310—74 |
| 2,898,765 | 8/1959 | Atkinson et al. | 74—5 |
| 3,074,283 | 1/1963 | Quermann | 74—5.5 X |

FRED C. MATTERN, Jr., *Primary Examiner.*

PALMER W. SULLIVAN, *Examiner.*

J. D. PUFFER, *Assistant Examiner.*